United States Patent [19]
Senyarich et al.

[11] Patent Number: 5,939,222
[45] Date of Patent: Aug. 17, 1999

[54] STORAGE CELL HAVING AN ALKALINE ELECTROLYTE, IN PARTICULAR A STORAGE CELL OF NICKEL-CADMIUM OR NICKEL METAL HYDRIDE

[75] Inventors: Stéphane Senyarich, Mornac; Patrick Viaud, Bordeaux, both of France

[73] Assignee: Alcatel Alsthom Compagnie Generale d'Electricite, Paris, France

[21] Appl. No.: 08/943,316

[22] Filed: Oct. 14, 1997

[30] Foreign Application Priority Data

Oct. 7, 1997 [FR] France ................................. 97 12510

[51] Int. Cl.⁶ ..................................................... H01M 2/14
[52] U.S. Cl. ............................ 429/94; 429/144; 429/206; 429/254
[58] Field of Search ..................................... 429/142, 144, 429/145, 249, 254, 94, 206

[56] References Cited

U.S. PATENT DOCUMENTS

| | | | |
|---|---|---|---|
| 3,186,876 | 6/1965 | Piechon | 429/144 |
| 3,330,702 | 7/1967 | Horowitz | 429/144 |
| 5,176,968 | 1/1993 | Blasi et al. | 429/145 X |
| 5,492,781 | 2/1996 | Degen et al. | 429/144 |

FOREIGN PATENT DOCUMENTS

| | | |
|---|---|---|
| 0 680 107 A1 | 11/1995 | European Pat. Off. . |
| 97/12510 | 7/1998 | European Pat. Off. . |
| 2 285 638 | 7/1995 | United Kingdom . |
| WO 92/12545 | 7/1992 | WIPO . |

OTHER PUBLICATIONS

Patent Abstracts of Japan, vol. 010, No. 005 (E–372) Jan. 10, 1986 corresponding to JP 60 170159 A (Matsushita Denki Sangyo KK) Sep. 3, 1985.

*Primary Examiner*—John S. Maples
*Attorney, Agent, or Firm*—Sughrue, Mion, Zinn, Macpeak Seas, PLLC

[57] ABSTRACT

A spirally wound storage cell having an alkaline electrolyte, the storage cell being in particular of the nickel-cadmium type or of the nickel metal hydride type, and including at least one positive electrode and at least one negative electrode on either side of a non-woven separator made up of fibers made exclusively of polypropylene, said storage cell being characterized by the fact that said separator (5) comprises first and second superposed layers, said first layer (6) being obtained by the "spun-bond" method and serving as a support, and said second layer (7) being obtained by needling fibers on said first layer, the needling tangling the fibers of the second layer together, and bonding them to the fibers of the first layer.

7 Claims, 1 Drawing Sheet

U.S. Patent    Aug. 17, 1999    5,939,222
FIG_1
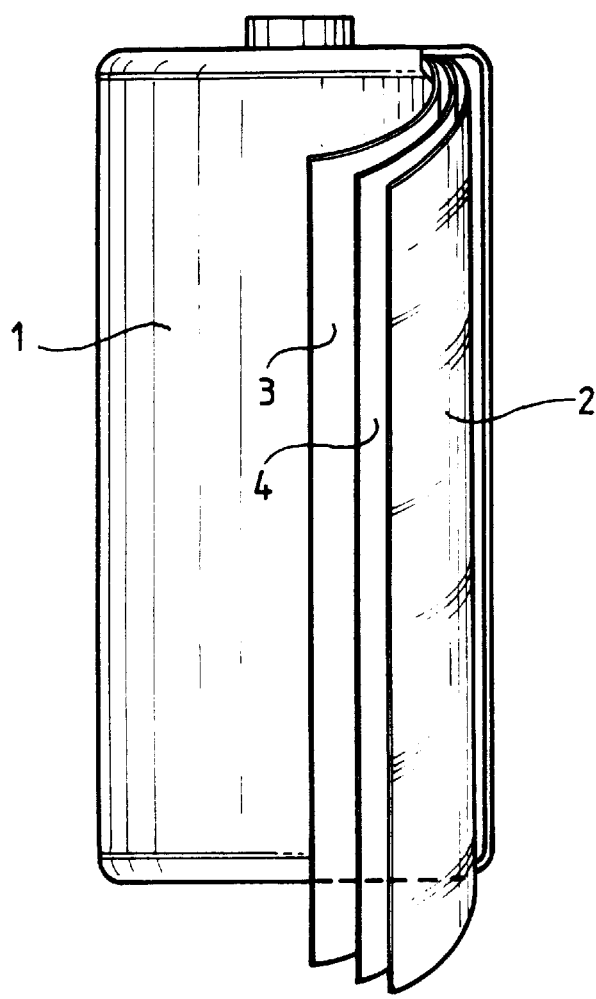
FIG_2
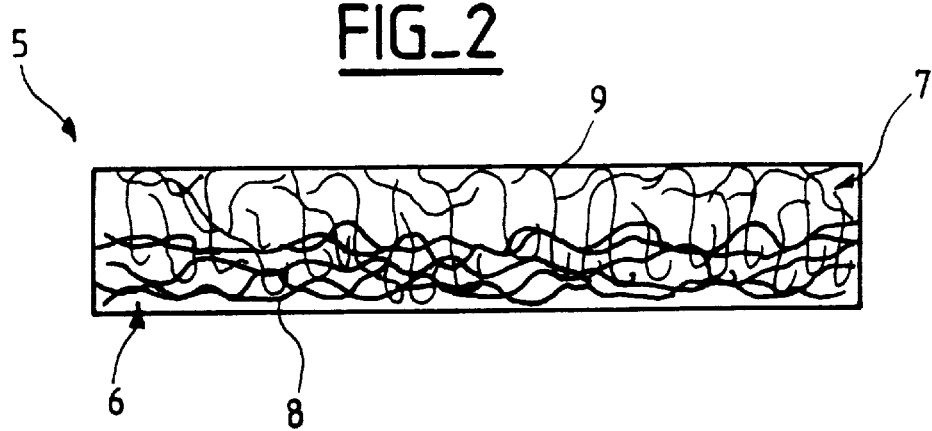

STORAGE CELL HAVING AN ALKALINE ELECTROLYTE, IN PARTICULAR A STORAGE CELL OF NICKEL-CADMIUM OR NICKEL METAL HYDRIDE

The present invention relates to a storage cell having an alkaline electrolyte, in particular a storage cell of the nickel cadmium (nicad) type or of the nickel metal hydride (NiMH) type, and more particularly to a separator for such a storage cell.

For a long time now, nicad storage cells have been used as autonomous energy sources. They are known to have good charge retention, i.e. when they are stored in the charged state, their capacity decreases slowly. The charge lost by a fully-charged nicad storage cell is about 20% over 7 days at 40° C.

Since recent portable equipment requires autonomous energy sources that are increasingly large, a new electrode couple has recently been developed. A nickel metal hydride storage cell has greater capacity per unit volume than a nicad storage cell, which means that a given format of storage cell has a longer life between charges if it contains a metal hydride negative electrode instead of a cadmium negative electrode. Unfortunately, a nickel metal hydride storage cell suffers from high self-discharge, which is a major problem for the user. The charge lost by a nickel metal hydride storage cell stored in the fully charged state is approximately twice that of a nicad storage cell, i.e. it is 40% over 7 days at 40° C. This poor result is due to the fact that, once a metal hydride electrode is charged, it is has greater reducing power than a cadmium electrode.

Some self-discharge is generally attributed to nitrogen-containing shuttles. Firstly, the ammonia and the nitrites present in the storage cell oxidize into nitrates on the charged positive electrode, thereby discharging it. Secondly, the nitrates and the nitrites reduce to ammonia on the charged negative electrode, thereby discharging it too. These reactions might take place several times because the species generated at the positive electrode react on the negative electrode where they are transformed into species capable of reacting with the positive electrode. That is why the term "shuttle" is used.

The reduction of the nitrates and of the nitrites into ammonia is accelerated on a metal hydride electrode. If this reaction is the limiting step in the kinetics of the nitrogen shuttle, then, in any given lapse of time, more shuttles can be produced in a nickel metal hydride storage cell. That assumption is generally accepted as explaining the high self-discharge of nickel metal hydride storage cells.

In order to limit the influence of the nitrogen-containing species, a proposal has been made in Patent Application JP-A-07 135 019 to limit the quantity of nitrogen-containing impurities brought in by the various ingredients used to make a nickel metal hydride storage cell. However, it is impossible to eliminate the nitrogen-containing impurities completely, and the small quantity remaining sustains high self-discharge. The transformation kinetics of the nitrogen-containing species on the charged electrodes are so fast that ammonia and nitrites exist permanently in the nickel metal hydride storage cell.

Another proposal made in the prior art consists in replacing the generally-used polyamide separator with a separator made of polyolefin which is chemically stable in the same medium. A polyamide separator is a potential source of nitrogen-containing impurities due to it deteriorating in the highly alkaline electrolyte used in nickel metal hydride storage cells.

Unfortunately, a polyolefin separator is difficult to use because it is strongly hydrophobic. In order to make it hydrophilic, it can be oxidized by fluorination treatment (see EP-0 696 822), by corona discharge (see JP-A-07 02 583), or by using other methods (see JP-A-07 192 714), or else hydrophilic monomers can be grafted on it. It is also possible to add a wetting agent to the electrolyte.

Among polyolefin separators, a polyethylene-fiber separator is chemically stable in the electrolyte used, and it does not bring additional nitrogen-containing species into the storage cell, but it has no effect on nitrogen shuttles due to impurities caused by the other ingredients of the storage cell. Therefore, the use of a polyethylene separator does not make it possible to reduce self-discharge significantly in NiMH storage cells.

Another solution consists in using a separator composed of a mixture of fibers made exclusively of polypropylene, referred to as "non-binding" fibers, with polypropylene fibers covered with a polyethylene covering, referred to as "binding" fibers. During manufacture of such a separator, the polyethylene (whose melting point is lower than the melting point of polypropylene) melts, thereby enabling the covered fibers to bind the non-covered fibers together. When certain hydrophilic species are grafted on it (see JP-A-06 196 141), such a separator is capable of fixing a certain quantity of ammonia, and therefore of limiting the quantity of impurities feeding the nitrogen shuttles. However, the quantity of ammonia that can be fixed by such a separator is lower than the quantity of nitrogen-containing species present in the storage cell.

The best way of reducing self-discharge in NiMH storage cells is to use a separator made exclusively of polypropylene which is capable of fixing more ammonia than a separator made of a mixture of polypropylene and of polyethylene. It can thus block, in the form of ammonia, all of the nitrogen-containing impurities present in the storage cell and brought in by the ingredients used. The nitrogen shuttles are thus completely eliminated as is the self-discharge associated with them.

Two methods are currently known for manufacturing a separator made exclusively of polypropylene (see in particular the Encyclopedia of Polymer Science and Engineering, 10, 219–23 (1985)).

Firstly, there is the "melt-blow" method which consists in depositing the molten polymer by blowing it intermittently onto a plane surface. The resulting fibers are short and are disposed randomly. On cooling, they adhere to one another. That method suffers from the drawback of producing a separator that is very fragile mechanically, that tears easily, and that is impossible to wind spirally to form a cylindrical storage cell.

Secondly, there is the "spun-bond" method which differs from the first method in that the molten polymer is expelled continuously via a die to spin continuous fiber. The fibers obtained are very long and of large diameter. The second method produces a separator which offers good mechanical properties, but which suffers from the drawback of being not very uniform and therefore of being very vulnerable to short circuits.

An object of the present invention is to provide a spirally wound storage cell having an alkaline electrolyte and including a separator which is both strong, and also capable of reducing self-discharge.

The present invention provides a spirally wound storage cell having an alkaline electrolyte, the storage cell being in particular of the nickel-cadmium type or of the nickel metal hydride type, and including at least one positive electrode and at least one negative electrode on either side of a non-woven separator made up of fibers made exclusively of polypropylene, said storage cell being characterized by the fact that said separator comprises first and second superposed layers, said first layer being obtained by the "spun-bond" method and serving as a support, and said second layer being obtained by needling fibers on said first layer, the needling tangling the fibers of the second layer together, and bonding them to the fibers of the first layer.

Preferably, the fibers of the two layers have the following parameters: each of the fibers in said first layer has a diameter lying in the range 10 μm to 20 μm, and each of the fibers in the second layer has a diameter lying in the range 2 μm to 15 μm; each of the fibers in said second layer has a length lying in the range 5 mm to 40 mm.

In a preferred embodiment, both the mass per unit area of said first layer and the mass per unit area of said second layer lie in the range 15 grams per square meter (g/m$^2$) to 80 g/m$^2$. The mass per unit area of said separator lies in the range 30 g/m$^2$ to 100 g/m$^2$.

The thickness of said separator lies in the range 80 μm to 400 μm, the thickness of said first layer lying in the range 20% of the thickness of the separator to 80% of the thickness of the separator.

Said separator is grafted with a vinyl monomer preferably chosen from acrylic acid and methacrylic acid.

Other characteristics and advantages of the present invention appear from the following description of embodiments given by way of non-limiting example. In the accompanying drawing:

FIG. 1 is a diagrammatic partially spread out perspective view of an alkaline storage cell of the type of the invention; and FIG. 2 is a diagrammatic section view of an embodiment of a separator of the invention.

EXAMPLE 1

A spirally wound storage cell 1 of the nicad type, shown in FIG. 1, was constructed made up of a positive electrode 3 whose active matter was nickel hydroxide, and of a negative electrode 2 whose active matter was cadmium hydroxide. The two electrodes were separated by a polyamide separator 4. The resulting assembly was wound spirally and placed in an AA-format can which was filled with an electrolyte composed of a mixture of potassium hydroxide, of sodium hydroxide, and of lithium hydroxide.

The storage cell was charged and then discharged twice over. After being charged for a third time, the storage cell was then stored at free potential for 7 days at 40° C. After returning to ambient temperature, the storage cell was fully discharged at a rate of C/5 so as to determine its remaining capacity. The loss of capacity was defined as being the difference between the discharged capacity obtained during the second discharge, and the discharged capacity obtained after the rest period of 7 days at 40° C., divided by the discharged capacity obtained during the second discharge. In this storage cell, the loss of capacity was 23%.

EXAMPLE 2

An NiMH storage cell was constructed that was analogous to the storage cell described in Example 1, except for the cadmium negative electrode which was replaced with a conventional hydridable alloy electrode.

The storage cell was charged and then discharged twice over. After being charged for a third time, the storage cell was then stored at free potential for 7 days at 40° C. After returning to ambient temperature, the storage cell was fully discharged at a rate of C/5 so as to determine its remaining capacity. The loss of capacity was defined in the same way as in Example 1. In this storage cell, the loss of capacity was 46%.

EXAMPLE 3

A storage cell of the NiMH type was constructed as described in Example 2, but the polyamide separator 4 was replaced with a separator made of fine polyethylene fibers made hydrophilic by oxidation treatment which may be a corona discharge or fluorination treatment under an oxygen atmosphere. The self-discharge of this storage cell was tested as described in Example 2. In this storage cell, the loss of capacity was 45%.

EXAMPLE 4

A storage cell of the NiMH type was constructed as described in Example 2, but the polyamide separator was replaced with a polyolefin separator made of a mixture of polyethylene fibers and of polypropylene fibers, and made hydrophilic by grafting acrylic acid. The self-discharge of the storage cell was tested as described in Example 2. In this storage cell, the loss of capacity was 48%. An identical result was obtained when the grafting was done with methacrylic acid.

EXAMPLE 5, OF THE INVENTION

A storage cell of the nicad type was constructed as described in Example 1, but the polyamide separator 4 was replaced with a separator of the invention, shown diagrammatically in section in FIG. 2.

This separator 5 included a first layer 6 of polypropylene fibers 8 of mean diameter 15 μm, which layer was made up using the "spun bond" method, and a second layer 7 of polypropylene fibers 9 of mean diameter 10 μm and of mean length 30 mm, which layer was made up using the needling method by means of conventional needles or of water needles. Such a method is described in particular in the article published in the International Nonwovens Bulletin 1/90 (21. Internationales Kolloquium uber Nonwovens, Brno, 8–10 November 1989); "Neue Maschinenentwicklüngen für Spunlaced Nonwovens Produkte" —pages 1–8.

This method makes it possible to tangle the fibers 9 in the second layer 7 and to insert them in part into the first layer 6 so as to bond them thereto. FIG. 2 (which is not to scale) shows such bonding very diagrammatically.

The overall thickness of the separator 5 was about 150 μm, about 40% of which corresponded to the thickness of the first layer.

The separator was grafted with acrylic acid. For this purpose it was impregnated with an aqueous solution containing acrylic acid and a photoinitiator, i.e. an agent serving to increase the sensitivity of the polymer to ultraviolet radiation; then it was subjected to ultraviolet radiation, rinsed with water, deionized, and dried.

The storage cell was subjected to the same test as in Example 1, and the loss of capacity measured was 18%.

The grafting may be performed with methacrylic acid, and the same result is obtained.

EXAMPLE 6, OF THE INVENTION

A storage cell of the NiMH type was constructed as described in Example 2 except that the polyamide separator 4 was replaced with the separator 5 of the invention, described in Example 5.

The storage cell was subjected to the same test as in Example 2, and the loss of capacity measured was 22%.

In order to give a clearer picture of the technical progress offered by the invention, the results of Examples 1 to 6 are given in Table 1 below.

(PA=polyamide; PE=polyethylene; PP=polypropylene; AA=acrylic acid; MA=methacrylic acid).

TABLE 1

| Example | 1 | 2 | 3 | 4 | 5 | 6 |
|---|---|---|---|---|---|---|
| Type of storage cell | nicad | NiMH | NiMH | NiMH | nicad | NiMH |
| Separator | PA | PA | oxized PE | AA or MA grafted PP + PE | AA or MA grafted PP | AA or MA grafted PP |
| Loss of capacity 7 days at 40° C. | 23% | 46% | 45% | 48% | 18% | 22% |

Furthermore, a separator of the invention retains the good mechanical properties of "spun bond" type known separators, while being much less vulnerable to short-circuits.

Naturally, the invention is not limited to the two above-described embodiments. Any means may be replaced by any equivalent means without going beyond the ambit of the invention. In particular, separators of the invention are applicable both to rectangular-block shaped storage cells and to spirally wound storage cells.

We claim:

1. A spirally wound storage cell having an alkaline electrolyte, the storage cell being nickel-cadmium or nickel metal hydride, and including at least one positive electrode and at least one negative electrode on either side of a non-woven separator made up of fibers made exclusively of polypropylene, said storage cell being characterized by the fact that said separator comprises first and second superposed layers, said first layer being obtained by the "spun-bond" method and serving as a support, and said second layer being obtained by needling fibers together and into said first layer, the needling tangling the fibers of the second layer together, and bonding them to the fibers of the first layer, wherein each of the fibers in said second layer has a length lying in the range 5 mm to 40 mm.

2. A storage cell according to claim 1, characterized by the fact that each of the fibers in said first layer has a diameter lying in the range 10 $\mu$m to 20 $\mu$m, and each of the fibers in the second layer has a diameter lying in the range 2 $\mu$m to 15 $\mu$m.

3. A storage cell according to claim 1, characterized by the fact that both the mass per unit area of said first layer and the mass per unit area of said second layer lie in the range 15 grams per square meter (g/m$^2$) to 80 g/m$^2$.

4. A storage cell according to claim 1, characterized by the fact that the mass per unit area of the separator lies in the range 30 g/m$^2$ to 100 g/m$^2$.

5. A storage cell according to claim 1, characterized by the fact that the thickness of said separator lies in the range 80 $\mu$m to 400 $\mu$m, the thickness of said first layer lying in the range 20% of the thickness of the separator to 80% of the thickness of the separator.

6. A storage cell according to claim 1, characterized by the fact that said separator is grafted with a vinyl monomer.

7. A storage cell according to claim 6, characterized by the fact that said vinyl monomer is chosen from acrylic acid and methacrylic acid.

* * * * *